US011946177B2

(12) United States Patent
Afriat et al.

(10) Patent No.: US 11,946,177 B2
(45) Date of Patent: Apr. 2, 2024

(54) POLYPROPYLENE COMPOSITIONS FOR SOFT NONWOVEN FABRICS

(71) Applicant: CARMEL OLEFINS LTD., Haifa (IL)

(72) Inventors: Adi Afriat, Haifa (IL); Michael Gishboliner, Karmiel (IL); Alon Shaham, Kiryat-Bialik (IL); Rotem Shemesh, Haifa (IL); Michael Shuster, Nesher (IL)

(73) Assignee: CARMEL OLEFINS LTD, Haifa (IL)

( * ) Notice: Subject to any disclaimer, the term of this patent is extended or adjusted under 35 U.S.C. 154(b) by 0 days.

(21) Appl. No.: 17/760,505

(22) PCT Filed: Apr. 1, 2020

(86) PCT No.: PCT/IL2020/050394

§ 371 (c)(1),
(2) Date: Mar. 15, 2022

(87) PCT Pub. No.: WO2021/059260

PCT Pub. Date: Apr. 1, 2021

(65) Prior Publication Data

US 2022/0349098 A1 Nov. 3, 2022

Related U.S. Application Data

(60) Provisional application No. 62/904,009, filed on Sep. 23, 2019.

(51) Int. Cl.

*D04H 1/4291* (2012.01)
*C08L 23/12* (2006.01)

(Continued)

(52) U.S. Cl.

CPC ........... *D04H 1/4291* (2013.01); *C08L 23/12* (2013.01); *C08L 23/142* (2013.01); *C08L 23/16* (2013.01);

(Continued)

(58) Field of Classification Search

CPC . D04H 1/4291; C08L 23/12–147; D01F 6/46; D10B 2321/021; D10B 2321/022

(Continued)

(56) References Cited

U.S. PATENT DOCUMENTS 7,319,077 B2 1/2008 Mehta et al.
9,879,364 B2 1/2018 Donahue et al.

(Continued)

FOREIGN PATENT DOCUMENTS

CN 103201337 A 7/2013
CN 103249773 A 8/2013

(Continued)

OTHER PUBLICATIONS

International Search Report issued in Application No. PCT/IL2020/050394 dated Jun. 10, 2020, 7 pages.

(Continued)

*Primary Examiner* — Matthew D Matzek
(74) *Attorney, Agent, or Firm* — CANTOR COLBURN LLP

(57) ABSTRACT

The invention provides polypropylene compositions for producing soft nonwoven fabrics, consisting of at least three propylene-based copolymers differing in content of alpha-olefin comonomers. The provided fabrics are soft and pleasant to touch.

17 Claims, 2 Drawing Sheets

Max y: 0.104513
At X: -2.717 °C
Max y: 0.0326288
At X: -51.021 °C
0.12
0.10
0.08
0.06
0.04
0.02
0.00
Tan(delta) tan(δ)
-100 -80 -60 -40 -20 0 20 40 60
Temperature *T* (°C)

(51) Int. Cl.
*C08L 23/14* (2006.01)
*C08L 23/16* (2006.01)
*D01F 1/04* (2006.01)
*D01F 1/10* (2006.01)
*D01F 6/46* (2006.01)

(52) U.S. Cl.
CPC .................. *D01F 1/04* (2013.01); *D01F 1/10* (2013.01); *D01F 6/46* (2013.01); *D10B 2321/021* (2013.01); *D10B 2321/022* (2013.01)

(58) Field of Classification Search
USPC .......................................................... 442/327
See application file for complete search history.

(56) References Cited

U.S. PATENT DOCUMENTS

2006/0172647 A1* 8/2006 Mehta ................ D04H 1/43918 442/327
2006/0293462 A1* 12/2006 Jacob ...................... C08L 23/10 525/240
2010/0256304 A1* 10/2010 Bernreitner ........... C08L 23/142 525/240
2012/0045956 A1* 2/2012 Tau ........................ D04H 1/544 526/348

FOREIGN PATENT DOCUMENTS

CN 106554569 A 4/2017
EP 0632147 A2 1/1995
EP 2144963 B1 * 2/2012 .............. C08L 23/10
WO 0149907 A2 7/2001
WO 2005073309 A1 8/2005
WO 2008124040 A1 10/2008
WO 2017198633 A1 11/2017

OTHER PUBLICATIONS

Written Opinion issued in Application No. PCT/IL2020/050394 dated Jun. 10, 2020, 5 pages.

Extended European Search Report issued in European Patent Application No. 20866981.2 dated Oct. 19, 2022, 7 pages.

First Office Action in Chinese App. No. 2020800665367; dated Feb. 15, 2023, 16 pages.

Kanai, Toshitaka, et al. "Theoretical analysis of the spunbond process and its applications for polypropylenes," AIP Conference Proceedings 1779, 120001 (2016), 7 pages.

Jinka et al., (2013). Atmospheric pressure plasma treatment and breathability of polypropylene nonwoven fabric. Journal of Industrial Textiles. 42. 501-514. 10.1177/1528083712464257.

Kanai et al. (2016)Theoretical analysis of the spunbond process and its applications for polypropylenes AIP Conference Proceedings 1779, 120001.

Kansal, Harsh. (2016). Experimental Investigation Of Properties Of Polypropylene And Non-Woven Spunbond Fabric. 3. 8-14. 10.9790/019X-03050814.

Shahidi et al., "Surface modification of polypropylene nonwoven fabrics by low temperature plasma followed by chitosan grafting". Biochemistry: an Indian Journal. 8. 99-105. 2014.

* cited by examiner

POLYPROPYLENE COMPOSITIONS FOR SOFT NONWOVEN FABRICS

CROSS REFERENCE TO RELATED APPLICATIONS

This application is a U.S. National Stage application of PCT/IL2020/050394, filed Apr. 1, 2020, which claims the benefit of U.S. Provisional Application Ser. No. 62/904,009 filed Sep. 23, 2019, both of which are incorporated by reference in their entireties herein.

FIELD OF THE INVENTION

The present invention relates to polypropylene compositions for manufacturing soft nonwoven fabrics. Particularly, the present invention relates to polypropylene compositions for preparing soft nonwoven fabrics by melt-spinning techniques, including spun-bonded and melt blown fabrics. The invention further provides compositions for preparing fibers, such as staple fibers, suitable for producing soft carded nonwoven fabrics.

BACKGROUND OF THE INVENTION

Nonwoven fabrics made of polypropylene are known for a long time. These fabrics can be made by various techniques, including spun-bonding, melt blowing, carding etc. Polypropylene homopolymer is usually a material of choice for nonwoven fabrics production, providing excellent spinnability and good mechanical properties. However, nonwoven fabrics made of polypropylene homopolymer have unpleasant touch stemming from high stiffness of the fibers.

Attempts have been made to impart softness to polypropylene fibers and nonwoven fabrics made thereof, including use of polypropylene random copolymers which exhibit lower stiffness and lower bonding temperature. Preparation of such random copolymers and nonwoven fabrics made therefrom was described, for example, in Chinese patent CN106554569. However, softness of said fabrics was not sufficient. In order to further improve the fiber and fabric softness, polypropylene homopolymer or random copolymer is mixed with a polypropylene based elastomer as described in U.S. Pat. No. 9,879,364. However, the elastomer addition results in undesirably tacky touch of the fibers, and complicates processability of the fibers as they tend to stick to each other.

Another way to enhance the softness of fibers and fabrics comprises using polypropylene heterophasic copolymers, namely copolymers comprising a matrix of polypropylene and a separate phase of ethylene-propylene rubber, finely dispersed in said matrix. Such copolymers, being insufficiently soft, create serious processing problems in production of fabrics with fibers diameter below 10-15 micron, causing unstable spinning, frequent fibers breakage and increased scrap. Heterophasic copolymers with random copolymer matrix, as described, for example, in U.S. Pat. No. 7,319,077, provide finely dispersed submicron rubber-like particles and enhanced softness, however, tackiness of the resulting material requires addition of slip agents, such as erucamide, into the composition. The slip agents migrate onto the surface of the fibers and reduce the tendency of fibers to stick together. However, the presence of these agents on the fiber surface has undesirable effects in some applications.

There is therefore a need for a polypropylene based material suitable for production of soft non-tacky nonwoven fabrics even without slip agents.

Perception of fabric softness is a complex phenomenon, with multitude contributing factors, including the fabric compressibility and texture, fibers diameter, smoothness and roughness. Advantageous pleasant touch of a nonwoven fabric may be achieved via proper combination of polymer softness without tackiness, high macroscopic smoothness and certain microscopic roughness of fibers, reducing contact area and friction between fibers. It is therefore an object of this invention to provide a polypropylene based fiber for nonwoven fabrics combining both softness and smoothness, and providing a silk-like or cotton-like tactile sensation, free of tackiness.

This invention aims at providing polymer compositions suitable for manufacturing soft and smooth non-sticking fibers by decreasing rigidity and imparting a certain degree of microscopic roughness for reducing the friction.

This invention further aims at providing a process for manufacturing polypropylene based compositions for making soft fibers and fabrics.

Other objects and advantages of present invention will appear as the description proceeds.

SUMMARY OF THE INVENTION

The invention relates to a composition for manufacturing polypropylene-based soft and pleasant to touch nonwoven fabrics comprising at least three propylene based polymers differing in content of comonomers selected from ethylene and C4-C10 alpha-olefins, said composition exhibiting in Dynamic Mechanical Thermal Analysis (DMTA) tests two separate glass transition peaks. The composition of the invention usually comprises copolymers of which at least one is a semi-crystalline copolymer comprising 0-5 wt % of a comonomer, at least one is a low crystallinity copolymer comprising 15-30 wt % of a comonomer, and at least one is a low crystallinity copolymer comprising 40-60 wt % of a comonomer. A preferred composition of the invention exhibits two glass transition peaks separated by at least 30° C. The composition of the invention preferably comprises at least three components A, B, and C as follows: component A being a semi crystalline polypropylene homopolymer or random copolymer comprising from 0 to 5 wt % of ethylene or C4-C10 alpha-olefin, while constituting from 55 to 90 wt % of said composition; component B being a low crystallinity copolymer of propylene comprising from 15 to 30 wt % of ethylene or C4-C10 alpha-olefin, while constituting from 9 to 35 wt % of said composition; and component C being a low crystallinity copolymer of propylene comprising from 40 to 60 wt % of ethylene or C4-C10 alpha-olefins, while constituting from 1 to 10 wt % of said composition. In some preferred embodiments, said component A constitutes from 65 to 85 wt % of the whole composition, said component B constitutes from 13 to 27 wt %, and said component C constitutes from 2 to 8 wt % of said composition. The composition of the invention may further comprise additives selected from particulate fillers, adhesion promotors, colorants, antioxidants, light stabilizers, lubricants, or acid scavengers.

The invention provides a process for manufacturing a polypropylene composition for making soft fibers and soft nonwoven fabrics with enhanced tactile performance, the process comprising i) polymerizing or copolymerizing propylene with other comonomers selected from ethylene and C4-C10 alpha-olefins in an amount corresponding to a desired comonomer content, using supported Ziegler-Natta catalytic system to produce components A, B and C as described above; ii) combining the produced components to obtain a macroscopically homogeneous polymer blend of components A, B and C wherein said comonomer desired content in said three components A, B and C is 0-5 wt %, 15-30 wt %, and 40-60 wt %, respectively; iii) optionally visbreaking said components by melt mixing with chain scission agents; and iv) optionally melt mixing said components with additives selected from particulate fillers, adhesion promotors, colorants, antioxidants, light stabilizers, lubricants, and acid scavengers. The process of invention may comprise multistep sequential polymerization of propylene with alpha-olefin, preferably ethylene, in three reactors in series, whereas the first, second, and the third reactors produce polymers with comonomer content of 0-5 wt %, 15-30 wt %, and 40-60 wt %, respectively. Alternatively, multistep polymerization may be conducted in two reactors in series producing binary combinations of the components. Such multistep polymerization processes provide individual components (A, B and C) and their proper combinations via reactor blending. Said process of invention may further comprise a step of post-reactor blending in discharge extruder, optionally followed by visbreaking. Said polymerization is usually performed in liquid or gas phase in the first reactor, and in gas phase in said second and third reactors. In some embodiments, said components are produced separately or in combinations of two, for example a blend comprising components A and B is produced separately from a blend comprising components A and C, while the final composition comprising components A, B and C is prepared by melt blending of said two blends; said melt blending may comprise visbreaking. Said particulate fillers may be selected from calcium carbonate, talc, glass beads, or cross-linked polymers, and the particle size of the fillers may range from 0.5 to 5 microns.

The composition of the invention is advantageously employed in manufacturing soft and pleasant to touch fibers and fabrics. The invention relates to a process comprising steps of a) providing said composition consisting of at least three polymers or copolymers of propylene with other comonomers selected from ethylene and C4-C10 alpha-olefins, said copolymers differing in their comonomer amounts, and said composition exhibiting in DMTA tests two separate glass transition peaks , and b) feeding said composition, optionally with additives, into a fiber spinning device, to manufacture soft fibers having smooth surface with lentil-shaped oval elevations for producing nonwoven fabrics of superior tactile properties. The composition of the invention for fiber spinning has preferably MFR between 10 and 1500 g/10 min.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

Figure 1:
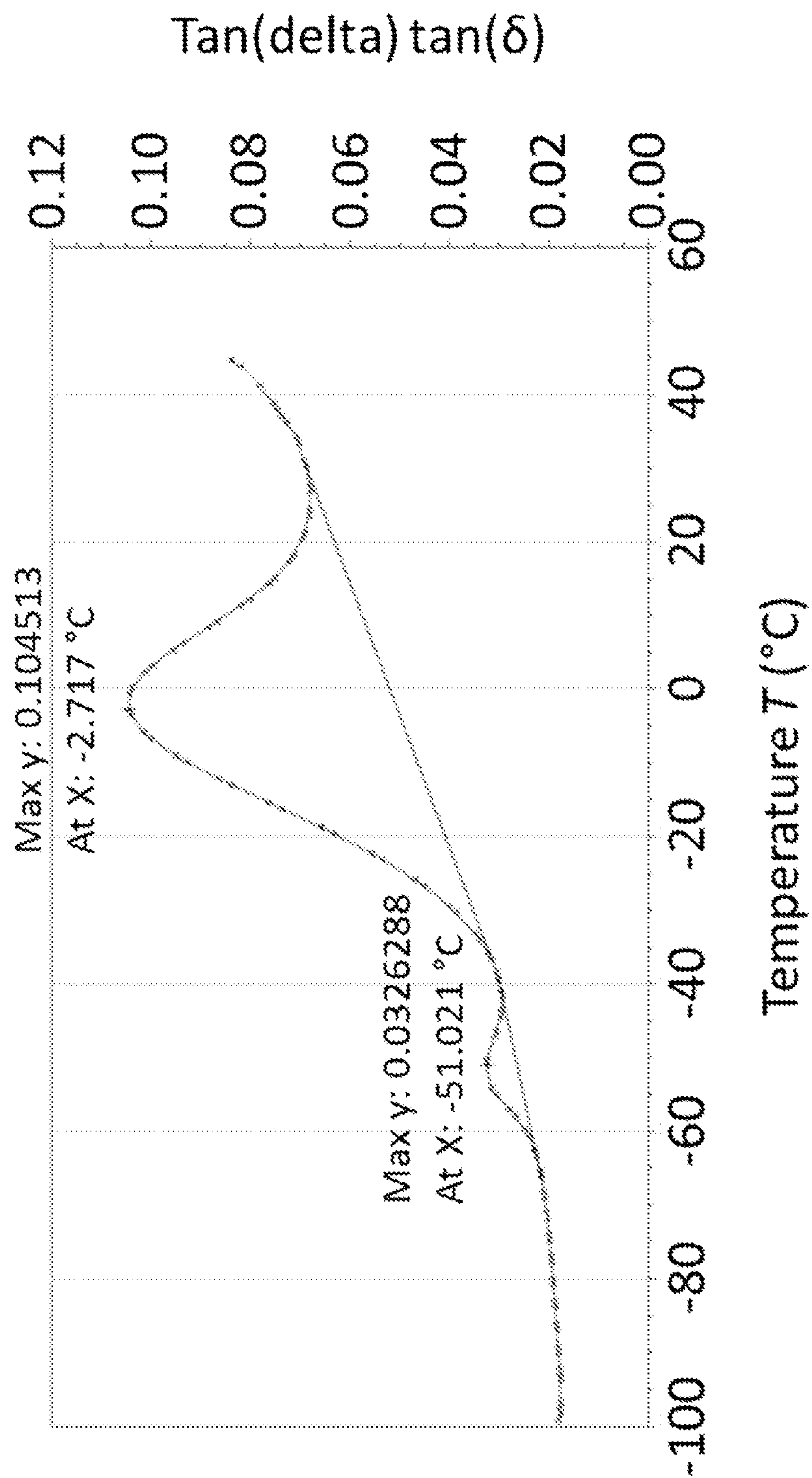
FIG. 1. presents DMTA tangent delta curve of a three-component composition according to one embodiment of the invention. The composition was prepared by melt mixing with visbreaking of two reactor blends in the ratio of 80:20. The first blend comprising a semi-crystalline polypropylene copolymer with 1% of ethylene and a low crystallinity copolymer with 20% of ethylene. The second comprises a semi-crystalline polypropylene homopolymer and a low crystallinity polypropylene copolymer with 50% of ethylene.

It has now been found that at least three propylene-based polymers, containing different amounts of alpha-olefin comonomer being blended in specific ratios, provide particularly soft fibers and fabrics with pleasant touch.

This invention relates to polypropylene compositions suitable for manufacturing of soft nonwoven fabrics with enhanced tactile performance. The compositions of the invention comprise at least one semi crystalline polypropylene homopolymer or random copolymer, comprising 0-5% by weight of ethylene or C4-C10 alpha-olefin (component A); at least one low crystallinity copolymer of propylene, comprising 15-30% by weight of ethylene or C4-C10 alpha-olefin (component B); at least one low crystallinity copolymer of propylene, comprising 40-60% by weight of ethylene or C4-C10 alpha-olefins (component C). Said component A constitutes from 55% to 90%, preferably 70-85%, most preferably 70-80% by weight of the total polymer components of the composition. Said component B constitutes from 9% to 35%, preferably from 15 to 30% by weight of the total polymer components of the composition. Said component C constitutes from 1% to 10%, preferably from 2% to 6%, weight of the total polymer components of the composition. Compositions of the invention exhibit two separate tan delta peaks in DMTA tests, indicating two relaxation processes taking place at different temperatures. The low temperature peak is associated with glass transition of component C, whereas the peak at higher temperature is associated with joint glass relaxation of components A and B, having single glass transition temperature. Preferably, components B and C of the composition are copolymers of propylene and ethylene.

Melt flow rate (MFR) of component A usually varies from 1 to 200 g/10 min. Intrinsic viscosity of component B varies from 0.5 to 2.0 dl/g, intrinsic viscosity of component C varies from 1.5 to 3.5 dl/g. MFR of the entire composition varies from 1 to 1500 g/10 min. Preferably components of the composition have narrow molecular weight distribution (MWD). The entire composition preferably is visbroken.

The composition of the invention may be prepared by multistep sequential polymerization or by post-reactor blending and modification, or by combination thereof. In one embodiment, the composition of the invention is prepared by sequential polymerization of propylene and alpha-olefin, preferably ethylene, in at least three reactors in series, using supported Ziegler-Natta catalytic system, whereas the component A is produced in the first reactor. The polymerization in the first reactor is performed in liquid phase or in gas phase, while polymerization in the second and the following reactors is performed in the gas phase. The monomers ratio in each reactor is chosen to match the desired co-monomer content in each component of the composition, as described above. The resulting polymer, leaving the last reactor is preferably visbroken in discharge extruder with peroxide or other chain length modifier known in the art, to achieve narrow MWD.

In another embodiment, constituents of the final composition are produced separately, then melt blended in extruder and pelletized. Preferably, the composition is visbroken with peroxide or other chain length modifier known in the art during the melt blending to achieve narrow MWD. In this case each of the separately produced constituents of the composition may comprise one or more components (A, B and C). For example, but not necessarily, a blend comprising components A and B may be produced separately from a blend comprising components A and C, while the final composition comprising components A, B and C is prepared by melt blending of these two blends. Preferably, the final composition is visbroken in the course of said melt blending.

In still another embodiment, constituents of the composition, prepared and preferably visbroken separately, are individually fed into a fiber manufacturing device allowing reasonably good melt mixing conditions. Formation of the final composition inside such device immediately precedes production of fibers or nonwoven fabric. In this case also, each of the separately prepared constituents of the composition may comprise one or more components (A, B, C).

Some of the preferred embodiments are further detailed below.

Compositions of the Invention

Here % means weight percent of a component related to the total polymer content. Compositions of the invention comprise from 55% to 90% (55-90%), preferably 70-85%, most preferably 70-80% of at least one semi-crystalline polymer of propylene comprising 0-5% of ethylene or C4-C10 alpha-olefin (component A); from 9% to 35%, preferably 15-30% of at least one low crystallinity copolymer of propylene, comprising 15-30% ethylene or C4-C10 alpha-olefin (component B); from 1% to 10%, preferably 2-6% of at least one low crystallinity copolymer of propylene, comprising 40-60% of ethylene or C4-C10 alpha-olefins (component C). Preferably, components of the composition have narrow MWD. Such narrow MWD may be achieved by visbreaking of the components, together or separately, using chain scission agents. In compositions of the invention prior to visbreaking, MFR of the component A may vary from 1 to 100 g/10 min. The intrinsic viscosity of the component B may vary from 0.5 to 2.0 dl/g, the intrinsic viscosity of the component C may vary from 1.5 to 3.5 dl/g. MFR of the final composition may vary from 1 to 1500 g/10 min. The combination of the three components defined above provides desired properties of the fabric, including softness, smoothness, pleasant haptics, sufficient mechanical strength, and enables fibers and fabrics manufacturing using techniques known in the art and employing standard equipment.

An excessive content of component A results in insufficiently soft fabrics. Too low content of component A results in tacky fibers, non-uniform distribution of fibers in the fabric, and it may disturb the process of fabric production. An excessive co-monomer content within component A makes its amorphous phase miscible with the amorphous phase of component C resulting in tacky fibers; the fibers lose their characteristic surface morphology and the fabric loses its pleasant soft touch. Such improved compatibility between the amorphous phases is indicated in the DMTA analysis by shift of the peak associated with glass transition of component C toward higher temperatures and by its at least partial overlapping with the peak corresponding to joint glass transition of components A and B.

An excessive content of component B results in tacky fibers with too high coefficient of friction, providing a rubbery feel. An insufficient content of component B results in excessively rigid fabric, whereas an insufficient co-monomer content of component B makes it more miscible with component A, resulting in undesirable tackiness and reduced strength of the fibers.

An excessive content of component C makes the fiber formation process unstable, possibly resulting in fiber breakage or even disrupting the manufacturing process. Lack of component C or its lower content causes smoothening of the fibers surface, resulting in loss of the pleasant soft touch. Insufficient co-monomer content in component C makes its amorphous phase miscible with that of component B, preventing formation of the characteristic surface texture of fibers and the desired soft touch of the fabric. Excessive co-monomer content in component C leads to increased size of the rubber particles and to fiber breakage.

Compositions of the invention may further comprise additives. Such additives include, but are not limited by, particulate fillers, colorants, antioxidants, light stabilizers, lubricants, or acid scavengers. In some embodiments, the additives may still comprise slip agents, though it is not necessary for pleasant touch of the fabric. Said particulate fillers include minerals, like calcium carbonate or talc, glass beads, or organic fillers, like cross-linked polymers. Examples of such cross-linked polymers suitable for the compositions of this invention include, but are not limited by, crosslinked polymethyl methacrylate polydimethylsiloxane or polymethylsilsequioxane, or combinations thereof. Particle size of said fillers may be in the range of 0.5 to 5 microns. Too small particles do not provide the desirable surface micro-roughness of fibers. Too large particles may cause fiber breakage. Preferably, the particulate fillers should have a spherical form. The fillers should be uniformly dispersed. In order to improve interaction of such particulate fillers with the polymer compositions, adhesion promoters may be used. One example of such adhesion promoter is commercially available maleic anhydride grafted polypropylene. Other appropriate adhesion promoters known in the art may also be used. Said particulate fillers may enhance to a certain extent surface micro-roughness of the fibers. However, for achieving the desired combination of low fiber rigidity, lack of tackiness, macroscopic smoothness, and microscopic roughness of the finally obtained soft nonwoven fabrics, all three polymer components of compositions of the invention, taken in the specific proportions as described above, are essential and necessary.

Compositions of the invention exhibit two separate tan delta peaks in DMTA tests, the low temperature peak being associated with glass transition of component C, whereas the peak at higher temperature being associated with combined glass relaxation of components A and B. FIG. 1 shows a DMTA thermogram recorded during heating of a three-component composition according to the invention. In this composition component A comprises approximately 1 wt %, component B comprises 20 wt %, and component C comprises 50 wt % of ethylene comonomer. Weights of the components per 100 g of the composition are 76 g, 20 g, and 4 g, respectively. The composition was manufactured by melt mixing of two reactor blends prepared by sequential polymerization in two reactors in series, using supported Ziegler-Natta catalytic system. The first reactor blend (I) comprises polypropylene copolymer with 1 wt % of ethylene (component A) and polypropylene copolymer with 20 wt % of ethylene (component B) in the ratio 75:25, and the second reactor blend (II) comprises polypropylene homopolymer (component A) and polypropylene copolymer with 50 wt % of ethylene (component C) in the ratio 80:20. Both blends were mixed in the twin-screw extruder in the ratio 80:20 and simultaneously visbroken with organic peroxide—2,5-dimethyl-2,5-di(tert-butylperoxy)hexane—to obtain the said final composition. Tangent delta plot of the thermogram shows two separate peaks in the temperature range from −60 to +30° C. Temperature position and intensity of the peaks allow their attributing to glass relaxations. Accordingly, the peak temperatures can be designated as glass transition temperatures (Tg). In this example, highly mobile amorphous phase of ethylene-rich low crystallinity propylene-ethylene copolymer (component C) forms separate domains undergoing glass transition in the temperature range from −60 to −40° C. and shows, correspondingly, a separate relaxation peak (Tg=−51° C.). On the other hand, amorphous phases of components A and B do not form separate domains and undergo a joint glass transition, characterized by a single relaxation peak in the temperature range of −40 to +20° C. (Tg=−3° C.).

Process of the Invention

In one embodiment, compositions of the invention may be prepared as reactor blends by multi-step sequential polymerization. In this case, the components of the compositions are produced by propylene polymerization in at least three reactors in series, whereas in each reactor a single component is produced. Components B and C, and, optionally, component A of the composition are produced by propylene polymerization in the presence of comonomer. Such comonomer may be ethylene or C4-C10 alpha-olefin, preferably the comonomer is ethylene. After polymerization, the obtained reactor blend is thoroughly melt mixed in extruder or other melt-mixing device to produce the final composition.

In another embodiment, constituents of the composition are prepared separately by single-step or multi-step polymerization, and then are melt mixed together in extruder or other melt-mixing device. For example, but not necessarily, two reactor blends may be prepared, one containing component A and component B, and another containing component A and component C. Optionally, the components A of these two blends may differ in molecular weight and comonomer content. The final composition is obtained by melt mixing of these two blends. Alternatively, the final composition may be produced by melt mixing of three blends, one containing merely component A, others containing reactor blends of component A with components B and C respectively. In still another embodiment, the above separate constituents may be mixed directly in extruder or other melt mixing device used for fiber and nonwoven fabric production. In such case, formation of the final composition immediately precedes production of the fibers or fabrics.

In some specific cases, MWD of the components of the composition should be substantially narrow in order to provide good processability. Spun-bonding technique usually requires narrow MWD, and melt-blown process requires still narrower MWD. Propylene polymers and copolymers exhibiting properly narrow MWD may be prepared via visbreaking of ex-reactor polymers by means of chain scission agents. The chain scission agents may comprise, without limitation, organic peroxides. The visbreaking reactions are performed during intimate mixing of molten polymers with chain scission agents at proper conditions, resulting in significant narrowing of MWD along with molecular weight reduction.

Visbreaking of compositions of the invention may be performed in different ways. In one embodiment, the visbreaking is performed on the final composition including all three components pre-blended, during melt mixing with a chain scission agent. In another embodiment, the visbreaking can be performed on separate pre-blends during melt mixing with a chain scission agent. In still another embodiment, each component may be visbroken separately. In this case final visbroken compositions may be prepared by melt blending of visbroken pre-blends or components in a mixing device, or in a fibers manufacturing equipment.

The process of the invention in some embodiments may comprise a step of admixing additives. Such additives include, but are not limited by, particulate fillers, colorants, antioxidants, light stabilizers, lubricants, acid scavengers, or adhesion promoters. Particle size of such fillers may be in the range of 0.5 to 5 microns. The process ensures uniform dispersing of the particles and proper homogenization of all components. In order to improve interaction of particulate fillers with the polymer composition, adhesion promoters may be used.

Fibers and Fabrics of the Invention

Fibers of the invention may be prepared from compositions of the invention by melt spinning, while employing techniques known in the art. Nonwoven fabrics of the invention may be prepared from the compositions of the invention directly in a single-step process, comprising spinning fibers and their layout. Examples of such fabrics are spun-bonded fabrics, melt-blown fabrics, or combinations thereof.

Alternatively, nonwoven fabrics of the invention may be manufactured from the compositions of the invention by use of pre-made continuous or staple fibers, by means of techniques known in the art, like carding and bonding.

Fibers and nonwoven fabrics of the invention demonstrate softness, pleasant silk-like or cotton-like touch, sufficient mechanical strength, and other useful properties.

Figure 2:
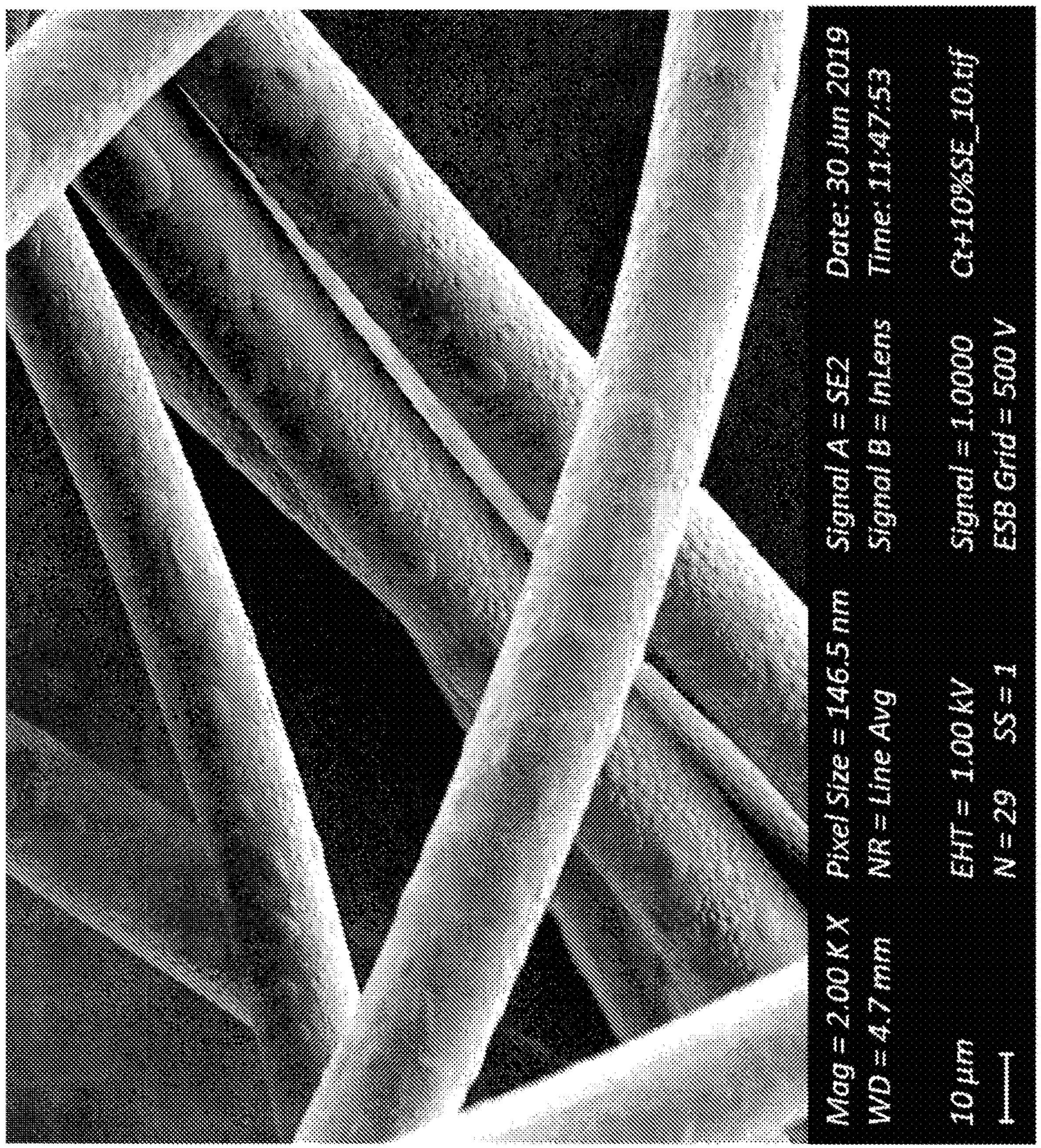
FIG. 2. is a high-resolution scanning electron microscope (HR-SEM) image under magnification of ×2000 of fibers produced from a composition according to the invention, as described in the detailed description below.

Compositions according to the invention provide surprisingly soft and pleasant fibers and fabrics. The superior haptic properties of the compositions stem from low rigidity and unique surface morphology of the fibers obtained from the compositions. FIG. 2 presents a high-resolution scanning electron microscope (HR-SEM) image of fibers produced from the composition of the invention described in the previous paragraph. The surface texture of the fibers reveals lentil-shaped elevations, distancing fibers from each other, thus enhancing compressibility of the fabric, and contributing to the sense of softness.

EXAMPLES

The examples hereinafter describe the preparation of the compositions of invention and their advantageous properties, without posing any limitation to the scope of the invention. The following components, procedures and measurement techniques are common for the examples.

Components

PP1 is a polypropylene homopolymer Capilene T12EV (MFR 25 dg/min, narrow MWD, pelletized), commercially available from Carmel Olefins Ltd.

PP2 is a polypropylene heterophasic copolymer—a reactor blend of 75% of Component A—polypropylene random copolymer (MFR 1 dg/min, ethylene content 1%) and 25% of Component B (low crystallinity propylene-ethylene copolymer, ethylene content 20%). The polymer was produced by sequential polymerization in three reactors in series (Component A was produced in the first reactor, and Component B—in the second and third reactors), and used in the form of reactor powder.

PP3 is the same heterophasic copolymer as PP2, further visbroken to MFR 25 by organic peroxide during melt mixing in the extruder, as described hereinafter. This polymer was used in pelletized form.

PP4 is a polypropylene heterophasic copolymer—a reactor blend of 80% of Component A—polypropylene homopolymer (MFR 2 dg/min, ethylene content 0%) and 20% of Component C (low crystallinity propylene-ethylene copolymer, ethylene content 50%). The polymer was produced by sequential polymerization in two reactors in series (Component A was produced in the first reactor, and Component C—in the second reactor), and used in the form of reactor powder.

PP5 is a polypropylene heterophasic copolymer—a reactor blend of 70% of Component A—polypropylene homopolymer (MFR 15 dg/min, ethylene content 0%) and 30% of Component C (low crystallinity propylene-ethylene copolymer, ethylene content 50%). The polymer was produced by sequential polymerization in three reactors in series (Component A was produced in the first reactor, and Component C—in the second and third reactors). The polymer was pelletized in the extruder and simultaneously visbroken to MFR 25 dg/min by means of organic peroxide—2,5-dimethyl-2,5-di(tert-butylperoxy)hexane. This polymer was used in the pelletized form.

Trigonox 101PP20—is a concentrate (20%) of the organic peroxide 2,5-dimethyl-2,5-di(tert-butylperoxy)hexane in porous polypropylene. It was used for visbreaking of the compositions and their components.

Irganox 3114 and Irgafos 168—are primary (phenolic) and secondary (phosphite) antioxidants, respectively, and are common heat stabilizers used for fibers. Both are commercially available from BASF.

Calcium stearate is an acid scavenger, commercially available from various producers.

Procedure

Preparation of the compositions, including visbreaking, was made using a twin-screw extruder (Berstorff ZE25, L/D=40:1), equipped with 4 gravimetric feeders, one side feeder hole die, cooling bath and strand pelletizer. Polymers were fed via main feeder, antioxidants and peroxide concentrate were pre-blended with one of the polymers and fed also via main feeder. Compositions were processed at 230° C., screw speed 200 rpm and throughput 5 kg/h.

Testing

All specimens for mechanical tests were conditioned at 23° C. and 50% relative humidity for 48 h prior to testing.

Tensile modulus was measured using Instron testing machine at 1 mm/min, according to ISO 527-2.

Tensile strength and elongation at yield and at break were measured using the same machine at 50 mm/min, according to ISO 527-2.

Flexural modulus was measured using Zwick testing machine at 1 mm/min, according to ISO 178.

Melt flow rate (MFR) was measured at 2.16 kg and 230° C., using Davenport instrument, according to ISO 1133.

Glass transition of the compositions was tested by DMTA using an ARES G2 instrument (TA Instruments). Dynamic temperature ramp was performed from −100 to +40° C. in torsion deformation mode on injection molded bars (length—50 mm, width—10 mm, thickness—4 mm) at frequency of 1 Hz and strain 0.1%. Plots of storage and loss moduli, and loss factor (tan delta) versus temperature were recorded and analyzed.

Spinnability of the compositions at increasing take-off speed was evaluated using a Goettfert RH25 capillary rheometer, equipped with 1 mm in diameter, 30 mm-long capillary and haul-off device, at constant piston travel speed 0.02 mm/s, initial spinning speed 30 mm/s and acceleration 6 $mm/s^2$. Load applied to the melt spun monofilament and corresponding spinning speed were recorded in the experiments. Ultimate spinning speed sustained by monofilament served as a measure of the composition spinnability. Spinnability at steady conditions was tested by melt spinning of the compositions through a single-hole 1 mm spinneret during two hours at take-off speeds 100-300 m/min. A ram extruder equipped with the drawing/winding device was used, ultimate speed and final fiber diameter were measured.

Fibers softness, haptics and tackiness were evaluated by a sensory panel of 5 testers, ranking each property on the scale from 0 to 5 (the higher the better). The individual relative scores were summed to provide the total score describing overall tactile feel of the fibers.

Example 1

Compositions of the Invention

Experimental compositions, their components, preparation conditions and properties are summarized in Table 1.

Compositions E1-E3 are designed for spun-bonding (MFR 25-32), while E4—for staple fibers (MFR 12). All the compositions exhibit good mechanical performance, no tackiness, superior softness and touch feeling. Overall tactile feel of the fibers as described by the total panel score for these compositions was 13-14 of 15 possible.

TABLE 1

Summary of the compositions of the invention

| Components | Units | E1 | E2 | E3 | E4 |
|---|---|---|---|---|---|
| | | Feeding | | | |
| PP1 | % | | 20.00 | | |
| PP2 | % | 79.45 | 59.45 | | 89.65 |
| PP3 | % | | | 79.80 | |
| PP4 | % | 20.00 | 20.00 | | 10.00 |
| PP5 | | | | 20.00 | |
| Trigonox 101PP20 | % | 0.35 | 0.35 | | 0.15 |
| Calcium stearate | % | 0.05 | 0.05 | 0.05 | 0.05 |

TABLE 1-continued

| Summary of the compositions of the invention | | | | | |
|---|---|---|---|---|---|
| Components | Units | E1 | E2 | E3 | E4 |
| Irganox 3114 | % | 0.05 | 0.05 | 0.05 | 0.05 |
| Irgafos 168 | % | 0.10 | 0.10 | 0.10 | 0.10 |
| | | Composition | | | |
| Component A | % | 74.8 | 79.8 | 74 | 75.5 |
| Component B | % | 21.6 | 17.3 | 20 | 22.5 |
| Component C | % | 3.6 | 2.9 | 6.0 | 2.0 |
| | | Properties | | | |
| MFR | g/10 min | 26.0 | 32.0 | 25 | 12 |
| Tensile strength at yield | MPa | 17.0 | 20.0 | 19 | 20.5 |
| Max. tensile strength | MPa | 23.1 | 22.0 | 22 | 23.5 |
| Elongation at yield | % | 16.1 | 14.0 | 12 | 17 |
| Izod notched @ 23° C. | kJ/m2 | 7.5 | 5.0 | 14 | 10 |
| Flexural modulus | MPa | 515.0 | 720.0 | 525 | 485 |
| Ultimate spinning speed | mm/s | 4500 | 5000 | 4000 | 5000 |
| Spinning at 300 m/min, 2 h | | Excellent | Excellent | Excellent | Excellent |
| Fibers softness (0 . . . 5) | | 5 | 4 | 5 | 5 |
| Fibers haptics (0 . . . 5) | | 5 | 4 | 5 | 5 |
| Fibers tackiness (0 . . . 5) | | 4 | 5 | 4 | 4 |
| Total score-fibers | | 14 | 13 | 14 | 14 |

Example 2

Comparative Compositions

Table 2 summarizes preparation and properties of comparative compositions, in which the ratio between the three polymer components is beyond the scope of the invention. Compositions C1, C2, C3 and C5 lack components, while composition C4 comprises the excessive amount of component C. Lack of component B (compositions C1, C3 and C5) results in high stiffness, inferior softness and touch feeling, while no tackiness. Lack of component C (composition C2) results in good spinnability, excellent softness, but significant tackiness, impairing touch feeling. Excessive amount of component C (compositions C3-C5) results in poor spinnability (ultimate spinning speed), albeit softness and haptics may be satisfactory (as in composition C4). It is of no avail in having softness and pleasant touch feeling, if the composition cannot be sustainably converted to fibers.

The comparison of the composition of invention with the comparative compositions clearly demonstrates advantages of the former ones, namely an advantageous combination of excellent spinnability, good mechanical properties, excellent softness, pleasant touch feeling and lack of tackiness.

TABLE 2

| Summary of the comparative compositions | | | | | | |
|---|---|---|---|---|---|---|
| Components | Units | C1 | C2 | C3 | C4 | C5 |
| | | Feeding | | | | |
| PP1 | % | 99.80 | | 59.80 | | |
| PP2 | % | | 99.45 | | 40.00 | |
| PP4 | % | | | | 59.45 | 99.45 |
| PP5 | | | | 40.00 | | |
| Trigonox 101PP20 | % | | 0.35 | | 0.35 | 0.35 |
| Calcium stearate | % | 0.05 | 0.05 | 0.05 | 0.05 | 0.05 |
| Irganox 3114 | % | 0.05 | 0.05 | 0.05 | 0.05 | 0.05 |
| Irgafos 168 | % | 0.10 | 0.10 | 0.10 | 0.10 | 0.10 |
| | | Composition | | | | |
| Component A | % | 100 | 75 | 88 | 78 | 80 |
| Component B | % | 0 | 25 | 0 | 10 | 0 |
| Component C | % | 0 | 0 | 12 | 12 | 20 |
| | | Properties | | | | |
| MFR | g/10 min | 25 | 34.8 | 25 | 27 | 20 |
| Tensile strength at yield | MPa | 30 | 15.7 | 23 | 18 | 21 |
| Max. tensile strength | MPa | 30 | 21.4 | 23 | 22 | 21 |
| Elongation at yield | % | 11 | 17.5 | 10 | 12 | 8 |
| Flexural modulus | MPa | 1300 | 466.0 | 1150 | 830 | 1000 |
| Ultimate spinning speed | mm/s | 5000 | 4300 | 1500 | Breaks | Breaks |
| Spinning at 300 m/min, 2 h | | Excellent | Excellent | Poor | Impossible | Impossible |

TABLE 2-continued

Summary of the comparative compositions

| Components | Units | C1 | C2 | C3 | C4 | C5 |
|---|---|---|---|---|---|---|
| Fibers softness (0 . . . 5) | | 0 | 4 | 0 | 3 | 0 |
| Fibers haptics (0 . . . 5) | | 0 | 2 | 0 | 3 | 0 |
| Fibers tackiness (0 . . . 5) | | 5 | 2 | 5 | 5 | 5 |
| Total score-fibers | | 5 | 8 | 5 | 11 | 5 |

While the invention has been described using some specific examples, many modifications and variations are possible. It is therefore understood that the invention is not intended to be limited in any way, other than by the scope of the appended claims.

The invention claimed is:

1. A composition for manufacturing polypropylene-based soft and pleasant to touch nonwoven fabrics comprising at least three components A, B, and C as follows:

i) component A being a semi-crystalline propylene homopolymer or random copolymer comprising from 0 to 5 wt % of ethylene or $C_4$-$C_{10}$ alpha-olefin, while constituting from 55 to 90 wt % of said composition;

ii) component B being a low crystallinity non-cross-linked copolymer of propylene comprising from 15 to 30 wt % of ethylene or $C_4$-$C_{10}$ alpha-olefin, while constituting from 9 to 35 wt % of said composition; and iii) component C being a low crystallinity copolymer of propylene comprising from 40 to 60 wt % of ethylene or $C_4$-$C_{10}$ alpha-olefins, while constituting from 1 to 10 wt % of said composition, and said composition exhibiting in DMTA tests only two separate glass transition peaks; and wherein said only two separate glass transition peaks include a low temperature peak associated with glass transition of component C, and a peak at higher temperature associated with joint glass relaxation of components A and B.

2. The composition of claim 1, wherein said two glass transition peaks are separated by at least 30° C.

3. The composition of claim 1, wherein said component A constitutes from 70 to 80 wt %, said component B constitutes from 17 to 24 wt %, and said component C constitutes from 2 to 6 wt % of said composition.

4. A process for manufacturing a polypropylene composition for soft nonwoven fabrics with enhanced tactile performance, comprising steps of i) polymerizing propylene using supported Ziegler-Natta catalytic system, with comonomers selected from ethylene and $C_4$-$C_{10}$ alpha-olefins in amounts corresponding to desired comonomer contents, in order to obtain three propylene-based copolymers to serve as three components A, B and C according to claim 1; and ii) melt mixing said components A, B and C in any appropriate melt mixing device to produce a composition exhibiting in DMTA tests only two separate glass transition peaks; and wherein said only two separate glass transition peaks include a low temperature peak associated with glass transition of component C, and a peak at higher temperature associated with joint glass relaxation of components A and B.

5. The process of claim 4, wherein said step i) comprises multistep sequential polymerization of propylene with alpha-olefin, in three reactors in series, whereas the first, second, and the third reactors provide polymers with comonomer content of 0-5 wt %, 15-30 wt %, and 40-60 wt %, respectively.

6. The process of claim 5 wherein said alpha-olefin is ethylene.

7. The process of claim 4, wherein said process comprises a step of post-reactor melt blending combined with visbreaking.

8. The process of claim 4, wherein said components are produced and visbroken separately, then melt blended in an extruder.

9. The process of claim 4, wherein said components may be produced separately or in combinations of two, for example a blend comprising components A and B is produced separately from a blend comprising components A and C, while the final composition comprising components A, B and C is prepared by melt blending of said two blends.

10. The process of claim 9, wherein said melt blending comprises visbreaking.

11. The process of claim 4, wherein said particulate fillers are selected from calcium carbonate, talc, glass beads, or cross-linked polymers, and their particle size ranges from 0.5 to 5 microns.

12. The process of claim 9, further comprising a step of feeding components A, B and C, either separately or as a homogeneous mixture, in a fiber manufacturing device.

13. The process of claim 4, comprising mixing said components with additives selected from particulate fillers, adhesion promotors, colorants, antioxidants, light stabilizers, lubricants, or acid scavengers.

14. Soft fibers produced from a composition according to claim 1, said fibers exhibiting lentil-shaped elevations spaced along their cylindrical surface.

15. The Fibers of claim 14, wherein said two glass transition peaks are separated by at least 30° C.

16. Fibers prepared from a composition according to claim 1;

characterized in that said fibers exhibit lentil-shaped elevations spaced along their cylindrical surfaces.

17. A polypropylene-based nonwoven fabric comprising at least three components A, B, and C as follows:

i) component A being a semi-crystalline propylene homopolymer or random copolymer comprising from 0 to 5 wt % of ethylene or $C_4$-$C_{10}$ alpha-olefin, while constituting from 55 to 90 wt % of said composition;

ii) component B being a low crystallinity copolymer of propylene comprising from 15 to 30 wt % of ethylene or $C_4$-$C_{10}$ alpha-olefin, while constituting from 9 to 35 wt % of said composition; and iii) component C being a low crystallinity copolymer of propylene comprising from 40 to 60 wt % of ethylene or $C_4$-$C_{10}$ alpha-olefins, while constituting from 1 to 10 wt % of said composition, and said composition exhibiting in DMTA tests only two separate glass transition peaks; and wherein said only two separate glass transition peaks comprise a low temperature peak associated with glass transition of component C, and a peak at a higher temperature associated with joint glass relaxation of components A and B.

* * * * *